Sept. 23, 1952  H. PENNINGTON  2,611,267
PRESSURE GAUGE FOR SAND FORMATION TESTERS
Filed Oct. 6, 1944
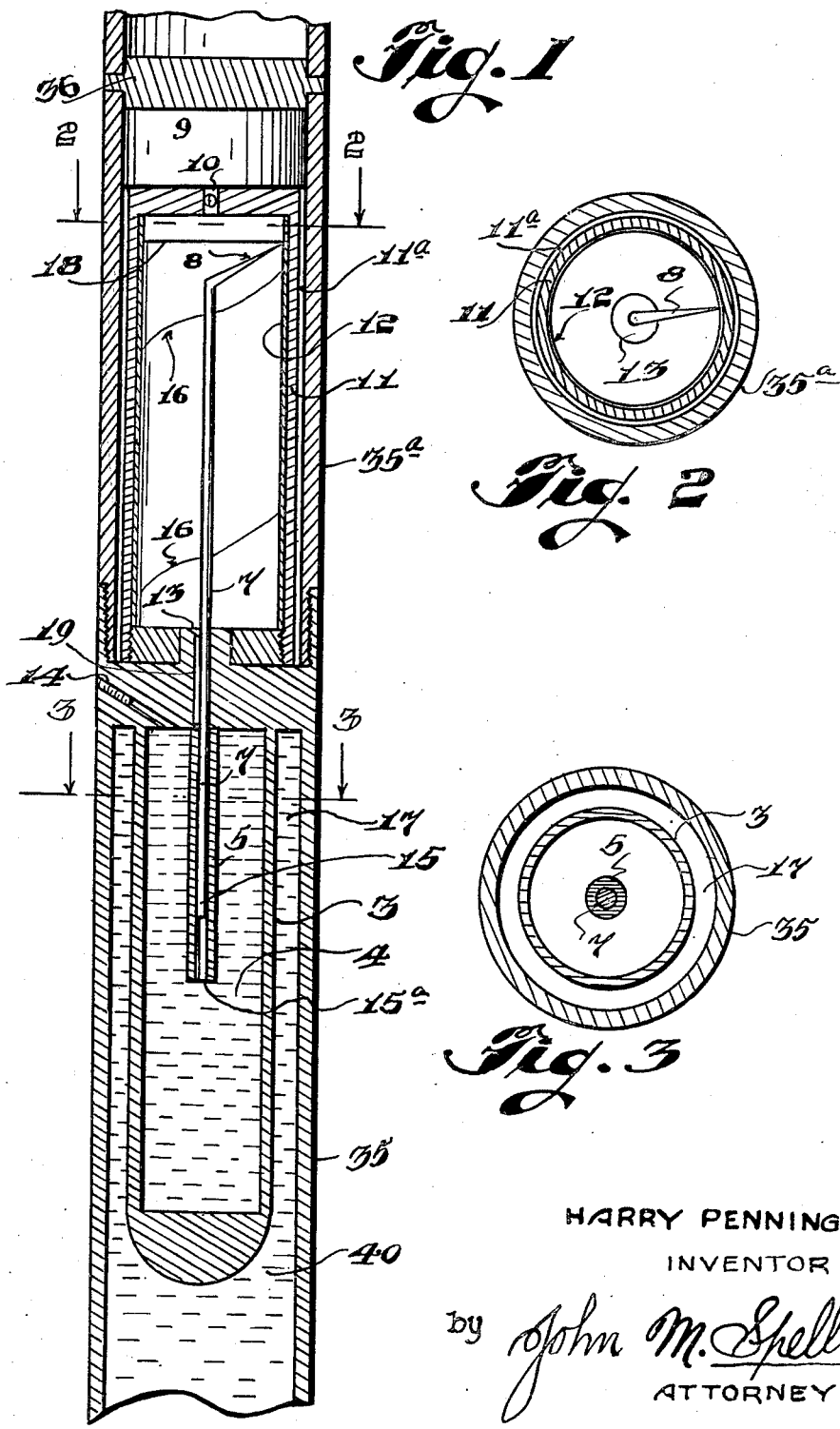
HARRY PENNINGTON
INVENTOR
by John M. Spellman
ATTORNEY Patented Sept. 23, 1952

2,611,267

UNITED STATES PATENT OFFICE 2,611,267

PRESSURE GAUGE FOR SAND FORMATION TESTERS

Harry Pennington, San Antonio, Tex.

Application October 6, 1944, Serial No. 557,530

1 Claim. (Cl. 73—151)

My invention relates to a pressure gauge for sand formation testers of the retrieving type which are employed in an open hole, or holes, both in advance of setting an oil string of casing in a well being drilled for fluid mineral, and during the process of drilling to obtain a sample for ascertaining the nature of fluid content of a sand formation encountered when drilling, and for obtaining the natural pressure therein.

My invention further relates to a pressure gauge in a Retrieving Sand Tester described in U. S. Patent No. 2,094,022, granted to me, September 28, 1937, so that in the operation of said tester a sample of fluid may be obtained from a sand formation, and the pressure may be ascertained.

It is the principal purpose of this present invention to obtain not only a direct measurement of sand formation pressure, but also a direct measurement of the rate of flow which may be obtained from the sand formation tested.

Still another object of this invention is to provide a novel type of ruggedly constructed time-pressure recording gauge for such high pressures as are found in deep walls, said gauge being suitably designed and constructed for enclosing within the relatively small cylindrical space within the tester tube, into which fluid from the sand formation is admitted for a test.

Further objects and advantages of the invention will be more clearly apparent from a perusal of the following detailed description, taken in connection with the accompanying drawings, and in the drawings:

Figure 1 is a vertical sectional view taken along the center line of the tester tube only, as set out in said patent, and illustrating an embodiment of my invention;

Figure 2 is a cross-sectional view taken on the line 2—2 of Figure 1; and

Figure 3 is a similar view taken lower down on said Figure 1.

The invention described and claimed herein is interposed between the upper and lower sections of the retrieving sand tester shown in U. S. Patent No. 2,094,022, and for convenience is located preferably at the upper end of the tester tube, it being understood that the tester tube is a stout metal tube, empty except for the air therein, when sent down into a well, and is sealed against intrusion of liquid except when desired, and connected with upper and lower tester parts. The arrangement is such that when the tester is lowered through the drill pipe into the well, and the lower end of the tester enters a rat hole below a full gauge hole, the sand formation is then, by the manipulation of the drill pipe and tester, placed in connection with the tester tube so that fluid from the said formation may flow directly into the tester tube through passages provided therefor as in the tester in the above issued patent, until the sand formation test is completed and the tester tube is filled to equalization of fluid pressure therein with the fluid pressure of the sand formation.

In carrying out the invention and as illustrated in Figure 1, the numeral 35 indicates a section of the tester tube and the numeral 40 denotes the test chamber which receives fluid from the sand formation tested.

Within the test chamber 40 is positioned a pressure liquid tube 3, said tube being filled with a slightly viscous liquid through an opening in the wall of the tube and provided with a filler plug 14. All free air is evacuated from this pressure liquid tube 3.

It will be apparent from the foregoing that as fluid, such as oil, gas and water, enters the test chamber 40 from the sand formation being tested, and the pressure of sand formation fluid builds up in the test chamber, the pressure liquid tube 3 is subjected to the sand formation pressure in the test chamber 40.

When thus subjected to such pressure, the pressure liquid tube 3 alters form in an amount which is proportional to the pressure exerted on the tube, to wit, the pressure of the liquid in test chamber 40. The reduction in volume of tube 3, occurring upon imposition of pressure in test chamber 40, depends upon the metal of which tube 3 is formed. The reduction in volume occurring is therefore related to the pressure imposed in chamber 40, a relation depending on Young's modulus of elasticity. This is employed in my invention for measuring formation pressures running into thousands of pounds per square inch.

Within the pressure tube 3 is located a relatively small stylus plunger tube 5 which is open at its lower end to admit pressure liquid 4 freely from the interior of pressure liquid tube 3.

Disposed within the stylus plunger tube 5 is a stylus plunger in the form of a small rod 7, the lower end of which plunger is indicated at 15, the upper end terminating in a stylus point at 8.

During a test, when pressure of the sand formation fluid begins to build up in the test chamber 40, as the fluid from sand formation is admitted when a test commences, the volume of the pressure liquid tube 3 decreases in amount proportional to the increase of pressure, i. e., depending on Young's modulus of elasticity, and a portion of the liquid 4 rises upwardly into the lower end of the stylus plunger tube 5, thereby elevating the stylus plunger 7 proportionately to fluid pressure elevation in the test chamber 40.

The stylus point 8 on the upper end of the stylus plunger 7 is so arranged that the point lightly contacts a polished metal foil 12, the metal foil comprising a renewable chart suitably fastened to the cylinder 11, for receiving a graph for horizontally recording time in terms of revolutions of the chart 12 and the cylinder 11, and vertically recording the pressure. The cylinder 11 and the chart 12 therein are rotated in uniform motion by a spring motor 9 or other type motor, the motion being imparted through the stub shaft 10 attached to the cylinder 11. An annular space 11-a is provided to prevent friction and to permit the cylinder to rotate freely.

The lower end of the cylinder 11 is so formed as to be rotatably seated on a circular bearing extension 13, which may be constructed as shown or of the anti-friction type, for securing the cylinder 11 in precise vertical position and concentric rotation.

The chart 12, of polished metal foil or other suitable material, is affixed to the inner wall of the cylinder 11 and the chart may be removed after a graph is scribed thereon, since the lower end of the cylinder 11 is connected to the lower cylinder end and also the sections 35 and 35-a of the tester are connected by means of a threaded connection. Another chart may then be similarly placed for another record of another test. Zero on the chart 12 is near its lower edge corresponding to the lowermost position of the stylus point at zero (plus atmospheric) pressure in the test chamber 40, which surrounds the pressure liquid tube 3.

Above the motor 9 is a partition 36 separating the motor and chart chamber from the upper portion of the tester, this partition 36 being the same partition 36 of the tester shown in said United States Patent No. 2,094,022.

Cross-sectional areas of the inner diameter of pressure liquid tube 3 and of the inner diameter of the stylus plunger tube 5, are so proportioned for a definite maximum sand formation fluid pressure as will elevate stylus plunger 7 and the point 8 near to the upper edge of the chart 12 to scribe a helical graph on the rotating chart as the test is made.

The stylus plunger 7 is held against rotation while moving upwardly proportionate to pressure, by the key 19, which fits in a keyway extending part length of the stylus plunger 7, but the keyway does not extend to the lower end of the stylus plunger, so that pressure liquid 4 cannot escape upwardly via this keyway, past the stylus plunger.

The method of operating the invention is as follows: the sand formation tester, with the present disclosure embodying this invention, interposed, as shown in Figure 1, is run into the drill pipe in the well, to the bottom thereof, where the lower end of the tester and the packer sleeve pass through bore of the core drilling bit, and the assembly of the tester locks into vertical position in the drill pipe. When lowering, the packer sleeve contacts the upper shoulder of the rat hole below as shown in said patent, and by frictional contact the packer sleeve seals off the rat hole from the upper full gauge hole, after which further manipulation opens passages in the tester at its lower end to permit fluid from the sand formation to flow upwardly into the test chamber 40, as in Patent No. 2,094,022.

As fluid from the sand formation flows into the test chamber 40, and formation pressure builds up therein, contracting pressure liquid tube 3, and forcing pressure liquid 4 into the lower open end of the stylus plunger tube 5, the stylus plunger 7 is elevated proportionately with the test chamber pressure. The chart 12, being rotated at a definite rate of speed, the non-rotating stylus point 8, contacting the rotating chart 12, scribes a graph thereon, the graph being in the form of a helix, one-half of the helical graph being shown at 16, thus forming a time-pressure recording graph.

When test chamber pressure equalizes with sand formation fluid pressure, obviously the stylus point 8 will not be elevated further, and with the chart continuing in rotation, the graph becomes, at its upper limit, a horizontal line 18 as scribed by the stylus.

The high pressure gauge, formed of pressure liquid tube 3, containing pressure liquid 4, stylus plunger 7, and chart 12, being calibrated, and the chart being rotated continuously during a test and at constant speed, it will be apparent that this invention furnishes a record of the number of rotations of the chart 12 and thus the time required for filling the test chamber 40 with fluid from the sand formation tested, and knowing the volumetric content of the test chamber 40, calculation may be extended to ascertain the rate of flow of fluid from the formation. At the same time, the uppermost horizontal line scribed circularly on the chart 12, records the pressure of the sand formation fluid. This is because during a test, the test chamber 40 is in free communication with the sand formation and the same pressure exists in both at the end of a test.

After a test is made as described, and fluid from the sand formation is sealed within the test chamber 40 as the tester is lifted off the rat hole shoulder, the tester is withdrawn from the drill pipe, after which the chart 12 carrying the graph or record thereon, is removed from the cylinder 11 for record and for further determination pertaining to the formation tested.

While the disclosure presents a practical means and method for obtaining the information required, it should be understood that the invention may include modifications, changes and alterations, in keeping with the inventive thought, such changes to be within the scope and meaning of the claim appended hereto.

What is claimed is:

A pressure gauge for measuring formation pressures in wells and the like comprising in combination a cylindrical housing enclosing a pressure test chamber adapted to receive a fluid whose pressure is to be measured and an instrument chamber, a fluid-tight partition separating said chambers, a plunger rod passing through a straight bore in said partition and making a fluid-tight sliding fit with said bore, means for preventing rotation of the plunger rod in said bore, said bore passing straight through said partition and forming a guide for said plunger rod, a stylus mounted on the end of said plunger rod which is in the instrument chamber, a rotatably mounted cylindrical chart mounted longitudinally in said instrument chamber, the said stylus being mounted so as to inscribe a record of pressure on said chart, means for slowly rotating said chart, a cylindrical metal pressure tube mounted longitudinally in said test chamber with one end closed and the other end mounted on and closed by said partition to form a fluid tight pressure chamber therein, said fluid tight chamber being completely filled with liquid and being in communication with said bore and through the bore with the free end of said plunger rod, the resilient cylindrical metal wall of said pressure tube extending into said test chamber and being sufficiently strong to withstand full formation pressure without flexing and to respond to formation pressure changes resiliently in accordance with Young's modulus of elasticity, the pressure-induced volume changes producing a corresponding change in the position of the plunger rod in said bore, whereby a pressure-time record of the pressure in said test chamber is obtained.

HARRY PENNINGTON.

REFERENCES CITED

The following references are of record in the file of this patent:

UNITED STATES PATENTS

| Number | Name | Date |
|---|---|---|
| 1,586,201 | Kauffmann | May 25, 1926 |
| 1,923,413 | Becker | Aug. 22, 1933 |
| 1,969,141 | McDonald | Aug. 7, 1934 |
| 2,158,569 | Bowen | May 16, 1939 |
| 2,189,919 | Moore | Feb. 13, 1940 |
| 2,223,913 | Johnston | Dec. 3, 1940 |
| 2,259,867 | Webster | Oct. 21, 1941 |
| 2,261,027 | Hopkins | Oct. 28, 1941 |
| 2,265,098 | Bettis | Dec. 2, 1941 |
| 2,441,894 | Mennecier | May 18, 1948 |